(No Model.) 3 Sheets—Sheet 1.
S. F. McDILL.
STREET SWEEPING MACHINE.

No. 427,185. Patented May 6, 1890.

Witnesses,
J. H. Nourse
H. C. Lee.

Inventor,
Samuel F. McDill
By Dewey & Co.
attys (No Model.) 3 Sheets—Sheet 2.

S. F. McDILL.
STREET SWEEPING MACHINE.

No. 427,185. Patented May 6, 1890.

Witnesses:
J. H. Nurse
H. C. Lee.

Inventor,
Samuel F. McDill
By Dewey & Co.
Attys (No Model.) 3 Sheets—Sheet 3.

S. F. McDILL.
STREET SWEEPING MACHINE.

No. 427,185. Patented May 6, 1890.

Witnesses,
Geo. N. Strong
[signature]

Inventor
Samuel F. McDill
By Dewey & Co
Attys

UNITED STATES PATENT OFFICE.

SAMUEL F. McDILL, OF SAN FRANCISCO, CALIFORNIA, ASSIGNOR OF ONE-HALF TO JOHN R. FRITZ, OF SAME PLACE.

STREET-SWEEPING MACHINE.

SPECIFICATION forming part of Letters Patent No. 427,185, dated May 6, 1890.

Application filed October 30, 1889. Serial No. 328,701. (No model.)

*To all whom it may concern:*

Be it known that I, SAMUEL F. McDILL, a citizen of the United States, residing in the city and county of San Francisco, State of California, have invented an Improvement in Street-Sweeping Machines; and I hereby declare the following to be a full, clear, and exact description of the same.

My invention relates to the class of street-sweeping machines; and it consists in the novel arrangement, construction, and combination of parts hereinafter fully described, and specifically pointed out in the claims.

The object of my invention is to provide a simple and effective machine for sweeping the streets and disposing of the dirt.

Figure 1:
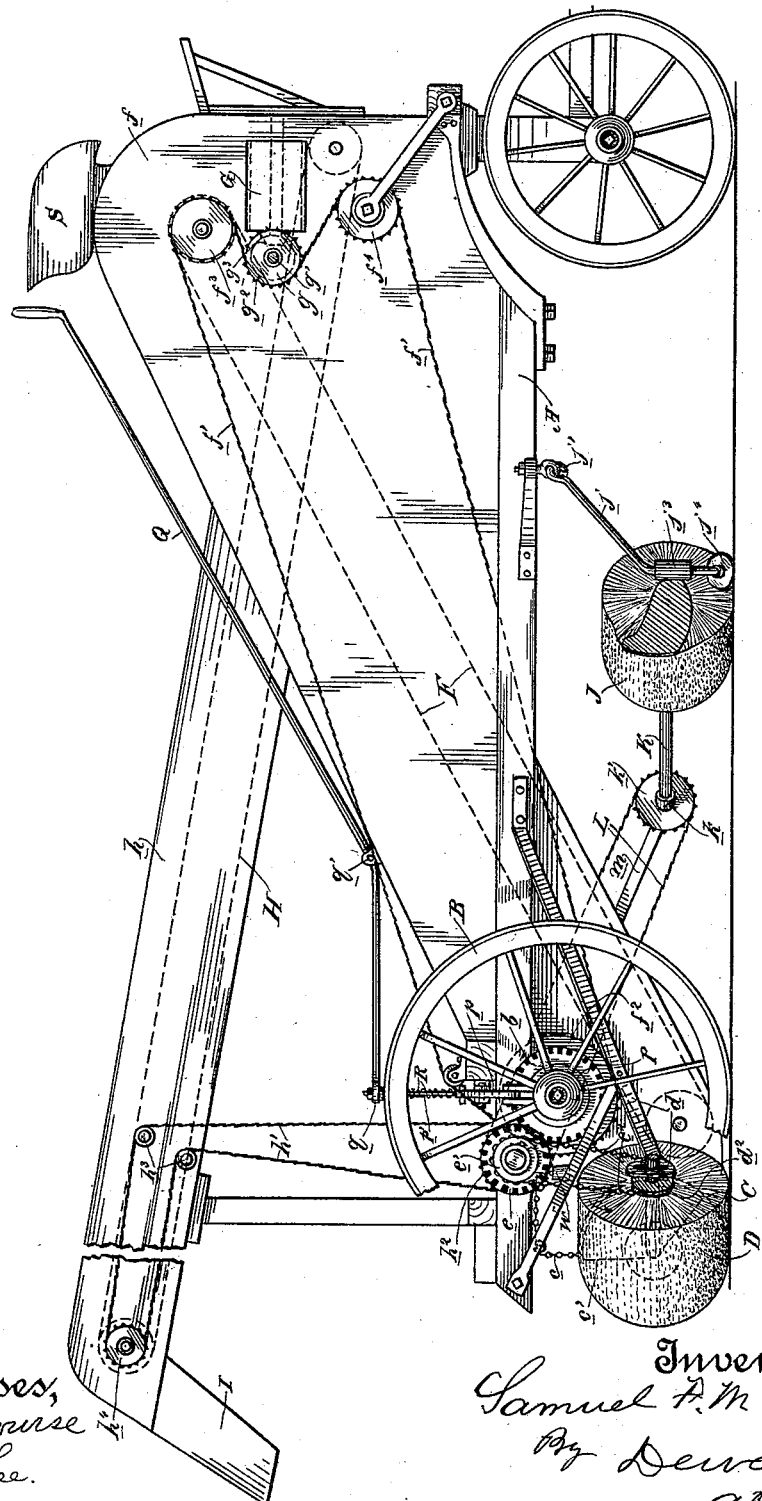
Figures 2, 3:
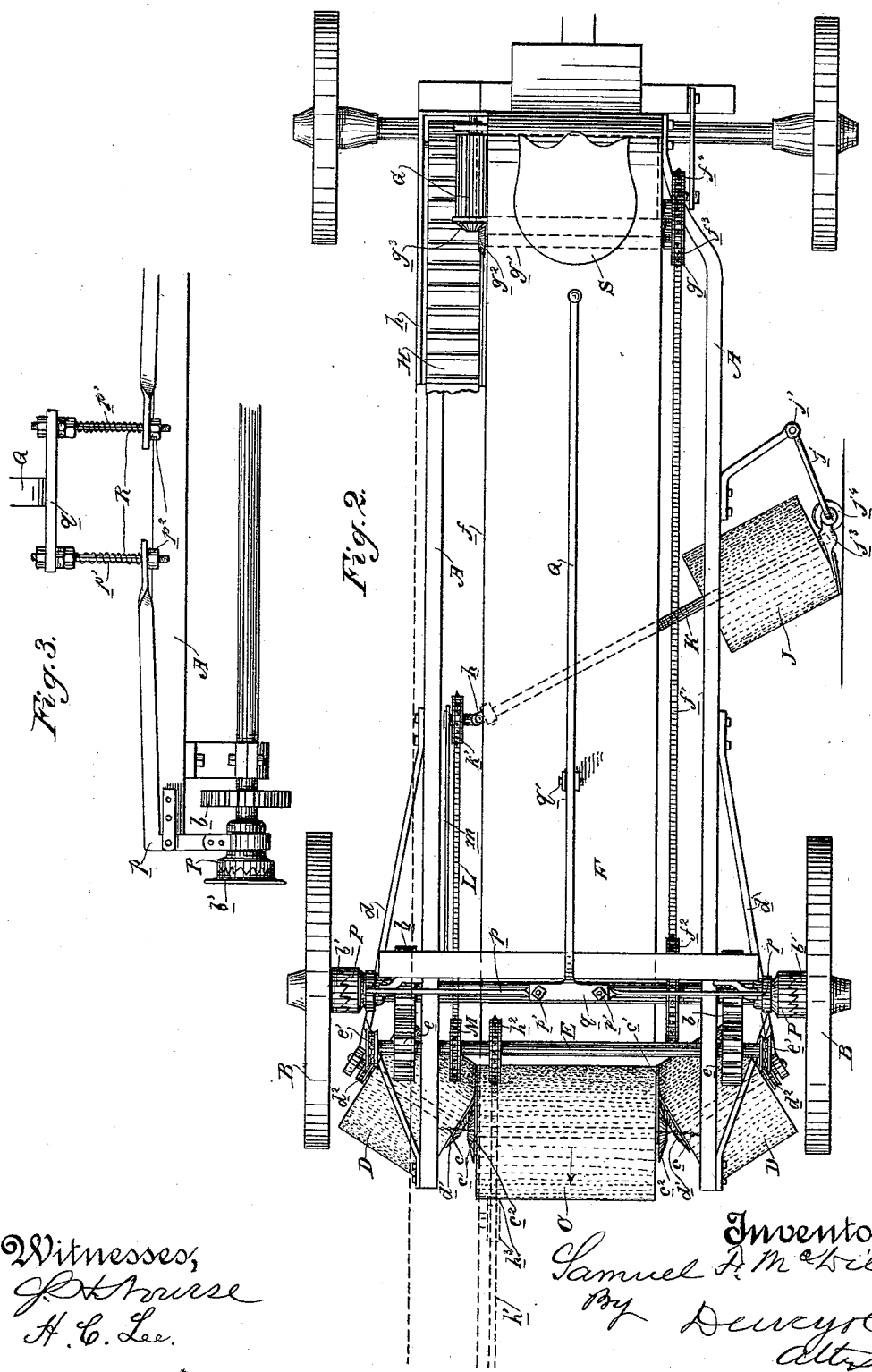
Figure 4:
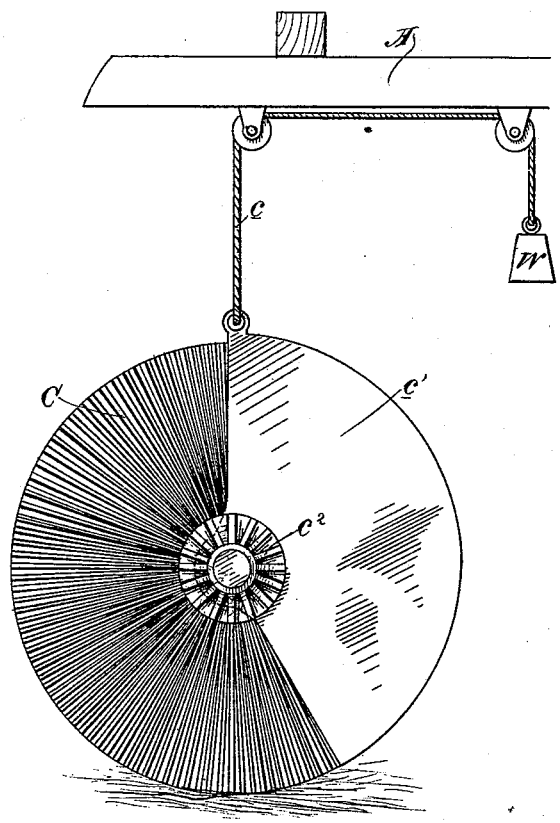

Referring to the accompanying drawings for a more complete explanation of my invention, Figure 1 is a side elevation of my street-sweeping machine. Fig. 2 is a plan. Fig. 3 is a detail of the clutch-operating mechanism. Fig. 4 is a detail showing the brush C, the chains $c$, and the shield-plates $c'$.

The frame A of the machine is mounted upon wheels, the rear ones B being the ones from which the power to drive the operative parts is taken.

At the rear of the machine is the main brush C. This is supported from the frame by chains $c$, the lower ends of which are connected with the separating shield-plates $c'$, secured on the ends of the brush-shaft, and said chains pass up over suitable guides above and carry counterbalance-weights W, whereby the brush can accommodate itself to the inequalities of the surface over which it travels. This brush lies in a straight plane at right angles to the line of travel of the machine, and at each end it is supplemented by the side brushes D, which extend outwardly and forwardly from it at an obtuse angle, and are supported by bars $d$, slotted at their lower ends and receiving the brush-shafts freely, so that said brushes can conform to the ground, as does the brush C. The shafts of these side brushes carry pinions $d'$, which mesh with pinions $c^2$ on the shaft of brush C, and all the brushes are driven by means of gears $b$ on the rear axle, meshing with gears $e$ on a transverse counter-shaft E, the ends of which carry sprocket-wheels $e'$, from which chains $e^2$ pass down to sprocket-wheels $d^2$ on the ends of the side-brush shafts. The direction of rotation of the brushes is shown by the arrows, being backwardly on top and forwardly below, so that they sweep the dirt up forwardly and deposit it in the end of the first elevator, the side brushes sweeping it inwardly and confining it so that it is properly directed into the elevator. The shield-plates $c'$ between the meeting ends of the brushes C and D are for the purpose of preventing the bristles of the brushes from catching on each other or interlocking, and by their use the brushes may be mounted close together to not miss any sweeping-surface.

F is the first elevator, consisting of an endless slatted carrier of suitable construction operating in a casing $f$. This elevator is mounted with its lower end directly in front of the brushes C D, adapting it to receive the dirt therefrom, and it thence extends forwardly and upwardly to near the front of the machine. It is driven by a chain $f'$, which passes around a sprocket-wheel $f^2$ on the rear axle and around a sprocket-wheel $f^3$ on the shaft of the upper roller, on which the upper end of the elevator is supported.

G is a cross-carrier mounted in the front of the machine. At its inner end it communicates directly with the upper end of the first elevator and receives the dirt therefrom and carries it out to the side of the machine, where it discharges it into the second elevator. This carrier is driven by the chain $f'$, which, after passing about wheel $f^3$, as heretofore mentioned, passes by and engages a sprocket-wheel $g$, and thence around an idler-wheel $f^4$ and down again. The wheel $g$ is on the end of a cross-shaft $g'$, the other end of which carries a bevel-pinion $g^2$, which meshes with a bevel-pinion $g^3$ on the shaft of the outer roller, over which the cross-carrier G turns at its outer end.

H is the second elevator, operating in the casing $h$. This elevator is mounted on the side of the machine, its lower end in direct communication with the outer end of the cross-carrier. It thence extends upwardly and backwardly clear of the rear end of the machine. This second elevator is driven by the chain $h'$, the lower end of which engages a sprocket-wheel $h^2$ on the counter-shaft E, and thence passes over suitable guide-pulleys $h^3$ to and about a sprocket-wheel $h^4$ on the shaft of the upper roller, around which the upper end of the elevator turns.

I is a downwardly-extending spout communicating with the upper end of the second elevator, and under which the dump-wagons drive to receive their loads of dirt.

J is a gutter-brush. This is carried by one side of the machine at any suitable point between the forward and rear wheels. It is carried at an angle, its outer end being supported by a hanger $j$, the upper end of which is freely swiveled to the frame by means of a common hook-and-eye connection at $j'$. The inner end of the brush-shaft K passes under the frame at an angle and has a knuckle-joint at $k$, whence it extends straight and receives a sprocket-wheel $k'$. From this sprocket-wheel extends an endless chain L to a sprocket-wheel M on the counter-shaft E, and a stretcher-bar $m$ extends between the brush-shaft and counter-shaft to support the former. By this construction the brush may have a rotary motion imparted to it, and at the same time may move in and out, its shaft sliding up and down on the joint of the shaft, to conform to all the conditions of the surface over which it travels. The lower end of hanger $j'$ has connected with it a casting $j^3$, which forms a bearing in which the outer end of the gutter-brush shaft is journaled, and there is also mounted on the end of said hanger a roller $j^4$, which is set at an angle of about forty-five degrees, and is adapted to travel against and in the angle of the curb and bottom of the gutter, and thereby to perfectly guide the brush.

The rear wheels B are loose on the rear axle, but are thrown into and out of connection therewith by a clutch mechanism as follows: The hubs of the wheels have clutches $b'$. Feathered on the axle are the sliding clutches P, which are adapted to engage and disengage the clutches $b'$. The clutches P are operated by pivoted elbow-levers $p$, with the inner ends of which are connected rods $p'$, having connected with their upper ends the cross-head $q$ of a lever Q, which is pivoted at $q'$ and extends forwardly to within reach of the driver occupying seat S. The rods $p'$ are connected with the levers $p$ by passing through them freely and receiving nuts $p^2$ below, whereby when the rods are raised by the lever Q they lift upon the levers $p$, and thereby cause them to withdraw the clutches P from the wheel-clutches $b'$. Springs R around rods $p'$ hold the levers $p$ down, so that their clutches P remain normally in engagement with the wheel-clutches.

The operation of the machine is as follows: The machine, advancing, transmits through its rear wheels the necessary movements to all the parts. The main brush C and side brushes D sweep up the dirt directly into the first elevator. The gutter-brush sweeps the dirt into the path of the rear brushes. The dirt is carried up and forwardly by the first elevator, discharged into the cross-carrier, and is by it delivered into the second elevator, by which it is carried up and back again, and delivered through the spout into the dump-wagons.

Having thus described my invention, what I claim as new, and desire to secure by Letters Patent, is—

1. In a street-sweeping machine, the combination of a rotary brush at the rear end of the machine, a forwardly-extending elevator into which the dirt is swept by the brush, a backwardly-extending elevator, and a cross-carrier at the front of the machine, communicating with the adjacent ends of the two elevators, whereby the dirt is delivered from one to the other, substantially as herein described.

2. In a street-sweeping machine, the combination of the wheeled frame, the rotary main brush at the rear of the frame, the forwardly-inclined diverging rotary side brushes at each end of the main brush, the forwardly-extending first elevator adapted to receive the dirt from the brushes, the backwardly-extending second elevator, and the cross-carrier at the front of the machine, communicating with the adjacent ends of the two elevators for passing the dirt from one to the other, substantially as herein described.

3. In a street-sweeping machine, the combination of a wheeled frame, a main brush at the rear thereof, and forwardly-diverging side brushes, two parallel oppositely-moving carriers and an intermediate cross-carrier, whereby the dirt is conveyed to the front of the machine and thence to the rear, and the driving mechanism comprising the counter-shaft under the frame, gearing between the rear axle and said shaft, sprocket-wheels on the ends of the counter-shaft, the side-brush shafts having sprocket-wheels on the outer ends thereof, endless chains between the sprocket-wheels, and gearing between the inner ends of the side-brush shafts and the adjacent ends of the main brush, substantially as described.

4. In a street-sweeping machine, the combination of the inclined adjustable gutter-brush at the side of the frame forward of the main and side brushes, and the support for its outer end, and the inclined roller on the lower end of the support, and adapted to travel in and against the angle formed by the curb and the gutter-bottom, substantially as herein described.

5. In a street-sweeping machine, the combination of the wheeled frame, the rotary main brush, the inclined forwardly-diverging side brushes, the inclined adjustable gutter-brush at the side of the frame forward of the main and side brushes, the forwardly-extending first elevator receiving the dirt from the rear brushes, the backwardly-extending second elevator, and the cross-carrier connecting the adjacent ends of the two elevators, substantially as herein described.

6. In a street-sweeping machine, and in combination with the wheeled frame and rear axle, the forwardly-extending elevator, the backwardly-extending elevator, and the cross-carrier connecting the adjacent ends of the two elevators, and the mechanism for driving the first-named elevator and cross-carrier, consisting of the sprocket-wheel on the axle, the sprocket-wheel on the upper roller of the elevator, the cross-shaft $g'$, the sprocket-wheel on said shaft, the endless chain engaging said sprocket-wheels, and the pinions connecting the cross-shaft with the outer roller of the cross-carrier, substantially as herein described.

7. In a street-sweeping machine, the rotary main brush and the rotary inclined side brushes at each end of the main brush, in combination with the shield-plates $c'$ on the shaft of the main brush and separating its bristles from those of the side brushes, substantially as herein described.

In witness whereof I have hereunto set my hand.

SAMUEL F. McDILL.

Witnesses:
C. D. COLE,
J. H. BLOOD.